(12) United States Patent
Willey

(10) Patent No.: US 7,400,602 B2
(45) Date of Patent: Jul. 15, 2008

(54) HYSTERESIS METHODS FOR AN ALWAYS-ON MOBILE STATION

(75) Inventor: William Daniel Willey, San Francisco, CA (US)

(73) Assignee: Research In Motion Limited, Waterloo (CA)

(*) Notice: Subject to any disclaimer, the term of this patent is extended or adjusted under 35 U.S.C. 154(b) by 401 days.

(21) Appl. No.: 11/127,408

(22) Filed: May 12, 2005

(65) Prior Publication Data
US 2006/0203763 A1 Sep. 14, 2006

Related U.S. Application Data

(63) Continuation-in-part of application No. 11/075,956, filed on Mar. 9, 2005.

(51) Int. Cl.
*H04Q 7/00* (2006.01)
(52) U.S. Cl. ............... 370/331; 370/328; 455/432.1; 455/440; 455/442
(58) Field of Classification Search ............ 370/331, 370/332, 328, 338, 342; 455/433, 434, 435.1, 455/436–440, 432.1, 442, 443, 444, 448, 455/449
See application file for complete search history.

(56) References Cited

U.S. PATENT DOCUMENTS

| | | | |
|---|---|---|---|
| 6,934,272 B2* | 8/2005 | Cheng et al. | 370/331 |
| 7,245,931 B2* | 7/2007 | Wang et al. | 455/515 |
| 2005/0141511 A1* | 6/2005 | Gopal | 370/395.2 |
| 2006/0182054 A1* | 8/2006 | Islam et al. | 370/328 |

FOREIGN PATENT DOCUMENTS

WO    WO 2004/064292 A2    7/2004

OTHER PUBLICATIONS

"Data Service Options for Spread Spectrum Systems: Service Options 33 and 66" 3GPP2 C. S0017-012-A Version 1.0, Jun. 11, 2004.

* cited by examiner

*Primary Examiner*—Duc Nguyen
*Assistant Examiner*—Anthony S Addy

(57) ABSTRACT

A system and method of packet zone hysteresis for a mobile station is presented. When a short data burst is to be sent on the control channel, a check is made to see if packet zone hysteresis might have caused the PCF-PSDN interface to be torn down, and if necessary, this interface is re-established by performing a packet data service reconnect to thereby enable transmission of the short data burst.

3 Claims, 13 Drawing Sheets

HYSTERESIS METHODS FOR AN ALWAYS-ON MOBILE STATION

RELATED APPLICATION

This application is a continuation-in-part of U.S. application Ser. No. 11/075,956 filed Mar. 9, 2005.

FIELD OF THE APPLICATION

The application relates to wireless systems and more particularly to packet data reconnect in wireless systems.

BACKGROUND

To comply with the 3GPP2 CDMA packet data services standard "3GPP2 C.S0017-012-A v1.0: Packet data Service Options for Spread Spectrum Systems: Service Options 33 and 66" (also known as TIA-707.12-B), a mobile station with a dormant packet data session is required to "reconnect" its packet data service whenever it detects a change in System ID (SID), Network ID (NID) or Packet Zone ID (PZID) parameters associated with the wireless network. The reconnect process is required to maintain PPP (point-to-point protocol) connectivity in case the wireless network needs to move the so-called "R-P" interface (also known as A10 and A11) between the Radio Access Network (RAN) and the Packet data Servicing Node (PDSN) associated with the packet data service or in some cases needs to assign a new IP address to the mobile station. The reconnect process requires the mobile station to send an origination message with Packet data Service option and Packet data Ready to Send (DRS) bit. The wireless network may assign a traffic channel to the mobile station during the reconnect process.

A feature called "packet zone hysteresis" is included in 3GPP2 C.S0017-012-A v1.0 in order to minimize the number of packet data reconnects when the mobile station moves back and forth between two systems while in a dormant state (such as SID/NID/PZID boundary). To implement the hysteresis feature, a mobile station keeps track of visited systems in a list which is called "Packet Zone List" in 3GPP2 C.S0017-012-A-each entry except the most recently added entry has a hysteresis timer. If a mobile station revisits a system whose hysteresis timer has not expired yet and it does not have any packet data to send, then it refrains from reconnecting its packet data service until the hysteresis timer has expired.

BRIEF DESCRIPTION OF THE DRAWINGS

Preferred embodiments will now be described with reference to the attached drawings in which.

DETAILED DESCRIPTION OF THE PREFERRED EMBODIMENTS

A broad aspect provides a method in a mobile station comprising: performing packet zone hysteresis to reduce a number of packet data service reconnects when a mobile station ping-pongs between multiple packet zones; when a short data burst needs to be transmitted on a control channel, performing a packet data reconnect if necessary to support transmitting the short data burst.

Hysteresis Activation

Figure 1:
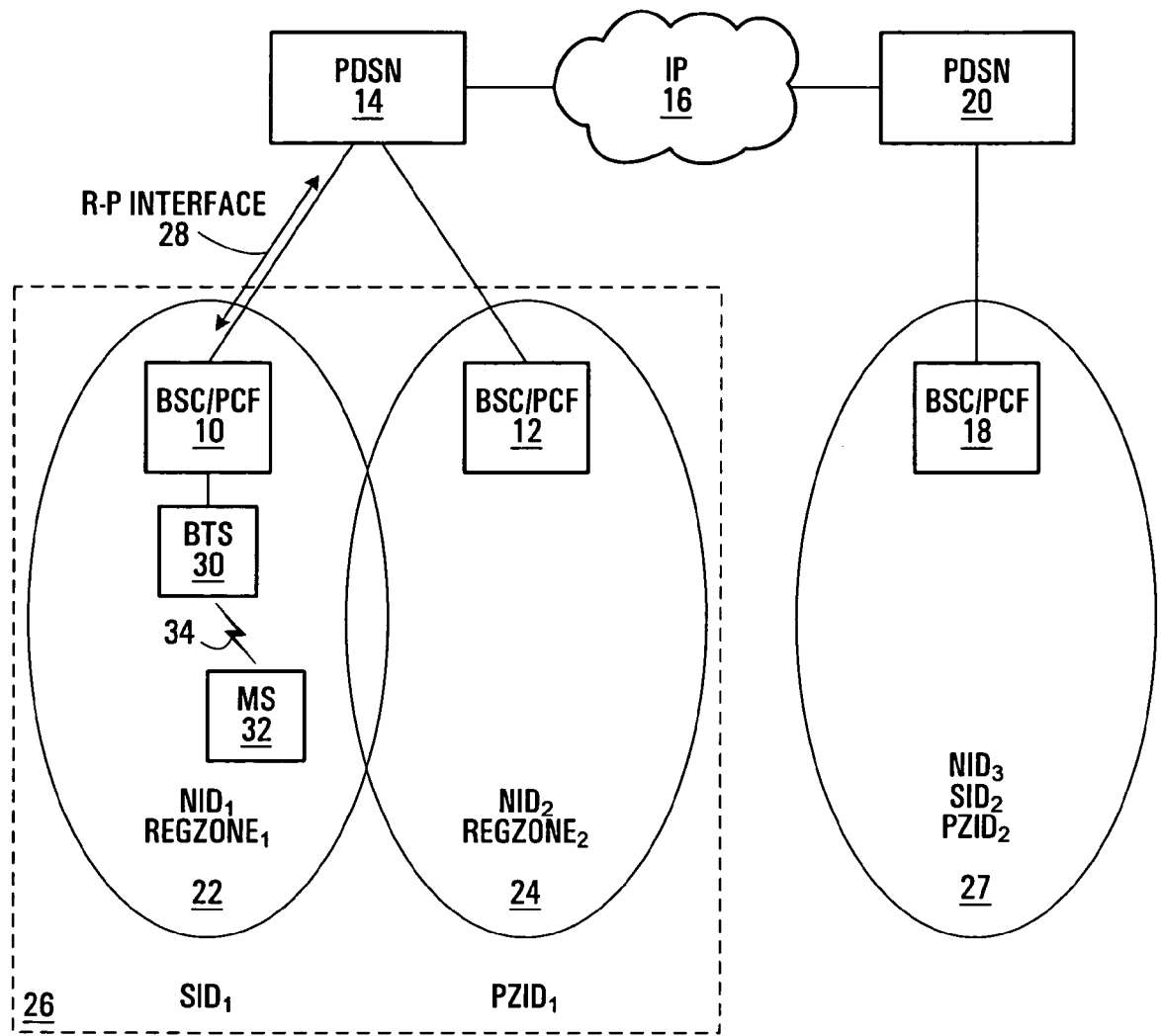
FIG. 1 is a block diagram of an example wireless system featuring a mobile station having hysteresis activation methods.

Referring to FIG. 1, a block diagram of an example wireless system featuring a mobile station having hysteresis activation methods is shown. The wireless system has a plurality of PDSNs (packet data service nodes) 14, 20 coupled together through an IP network 16. A first PDSN 14 is coupled to a plurality of BSCs/PCFs (base station controllers/packet control functions) 10, 12. The PCF is typically collocated with a BSC or resident with BSC functionality. The first PDSN 14 is coupled to the BSC/PCF 10 through an R-P interface 28. Each BSC supports a respective wireless network having details that are not shown with exception of a single BTS (base station transceiver) 30 shown under the control of BSC 10. The single BTS 30 is coupled to a mobile station 32 through a wireless connection 34. Coverage areas are SID/NID/PZID zones having associated with them a SID (system ID), a NID (network ID), and a PZID (packet zone ID). The BSC 10 has a coverage area 22 having a network identifier $NID_1$, and a registration zone ID $REGZONE_1$ while the BSC 12 has a coverage area 24 having a network identifier $NID_2$ and a registration zone ID $REGZONE_2$. A combined area 26 through which packet service is provided by the PDSN 14 has a packet zone ID $PZID_1$ and a system ID $SID_1$. A second PDSN 20 is coupled to a single BSC/PCF 18. The single BSC/PCF 18 has a coverage area 27 having a $NID_3$, $SID_3$, and $PZID_3$.

In operation, the mobile station 32 is required by the CDMA packet data service option standard, 3GPP2 C.S0017.12-A v1.0, to perform a packet data reconnect in certain cases when it detects a change in SID/NID/PZID. The packet data reconnect allows the wireless system to track the mobile station 32 so that packet data may be delivered to the mobile station 32. In some cases when the mobile station 32 is on a boundary between different SID/NID/PZID zones, an excessive number of packet data reconnects can occur. In order to minimize the number of packet data reconnects, the mobile station 32 is equipped with a reconnect hysteresis feature.

According to the reconnect hysteresis feature defined in 3GPP2 C.S0017-012-A v1.0, if the mobile station 32 has recently performed a packet data reconnect to a SID/NID/PZID zone, then it will not perform another packet data reconnect to the SID/NID/PZID zone when the mobile station 32 revisits within a certain time period since its last visit. For example, if the mobile station 32 has recently visited the coverage area 24 and moves from the coverage area 22 to the coverage area 24, then it will detect a change in the NID from $NID_1$ to $NID_2$ but will not perform a packet data reconnect until a certain time period has expired since the mobile station 32 last visited the coverage area 24. In order to keep track of recently visited SID/NID/PZID zones, the mobile station 32 preferably maintains a packet zone list, which contains a list of recently visited SID/NID/PZID zones.

Figure 2:
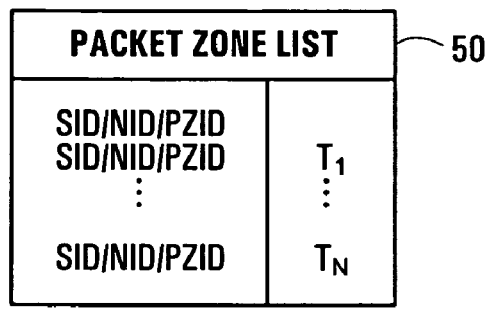
FIG. 2 is a table of an example packet zone list.

Turning now to FIG. 2, a table of an example packet zone list is shown, as indicated at 50. The packet zone list contains an identification of SID/NID/PZID zones recently visited by the mobile station 32 and respective hysteresis timers $T_1, \ldots T_N$. The packet zone list has a maximum length, which specifies how many entries can be entered. The entries are ordered with newer entries on top and older entries on bottom. The newest entry in the packet zone list (i.e. topmost entry) does not have an active hysteresis timer. Before a new entry is added to the packet zone list, a hysteresis timer is activated for the newest entry currently in the list and then the new entry is added without an active hysteresis timer. The reconnect hysteresis feature is used so that the mobile station 32 does not immediately perform a packet data reconnect after changing packet zones to a zone that was previously visited within some time interval.

Figure 3:
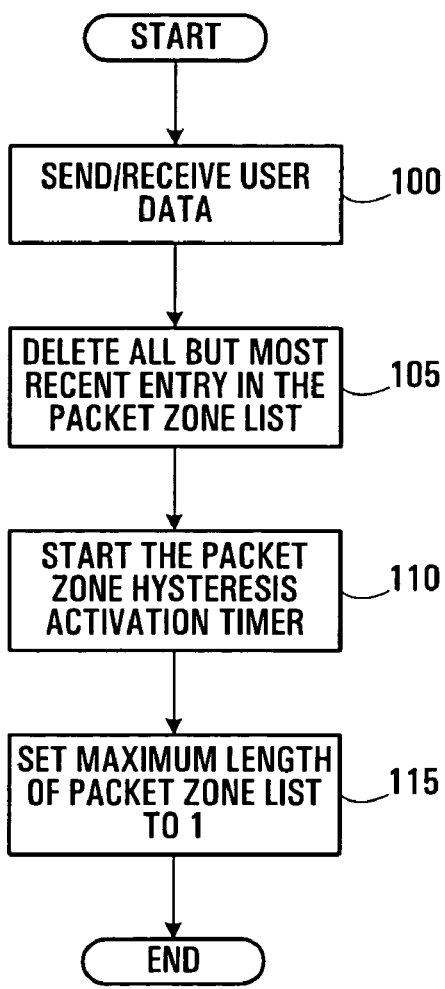
FIGS. 3 and 4 are flowcharts of conventional methods of hysteresis activation in the mobile station of FIG. 1.
Figure 4:
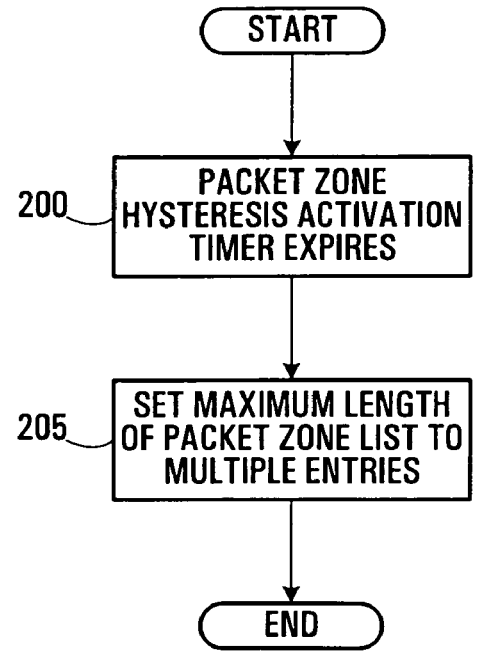

Turning now to FIGS. 3 and 4, flowcharts of conventional methods of hysteresis activation in the mobile station 32 are shown. FIG. 3 shows behavior of the mobile station 32 when it sends or receives packet data. If the mobile station 32 has sent or received user packet data at step 100, then at step 105 the mobile station 32 deletes all entries in the packet zone list except for the newest entry. At step 110, the mobile station 32 starts a packet zone hysteresis activation timer. If the packet data exchange was on a traffic channel, then the packet zone hysteresis activation timer starts when the mobile station 32 goes dormant. For the case of a short packet data burst on the common channel, the mobile station 32 will already be dormant. At step 115, the mobile station sets the maximum length of the packet zone List to 1. This effectively disables the reconnect hysteresis feature since the packet zone list cannot maintain a record of previously visited SID/NID/PZID zones. When the packet zone hysteresis activation timer expires, hysteresis will be re-activated. While hysteresis is effectively disabled, any change in the SID/NID/PZID parameters triggers a packet data reconnect. FIG. 4 shows behavior of the mobile station 32 when the packet zone hysteresis activation timer expires. Once the packet zone hysteresis activation timer expires at step 200, then at step 205 the maximum length of the packet zone list is set back to being greater than one so that the packet zone list enables multiple entries. At this point, the mobile station 32 has activated hysteresis but has lost entries in the packet zone list.

Hysteresis is disabled whenever the mobile station 32 sends or receives packet data and is not re-activated for a period of time after sending or receiving packet data. Furthermore, when hysteresis is re-activated, the packet zone list is cleared except for the most recent entry. This is the case even for a very quick packet data exchange such as reception of a single email message, sending a calendar/contact update, or sending a keep alive ping. Therefore, sending or receiving packet data impairs the reconnect hysteresis feature. As a result, excessive packet data reconnects may occur for example when the mobile station 32 alternates between two SID/NID/PZID zones, which may occur near zone barriers or overlaps. This may reduce battery life of the mobile station 32 and consume cellular air-interface capacity.

Figure 13:
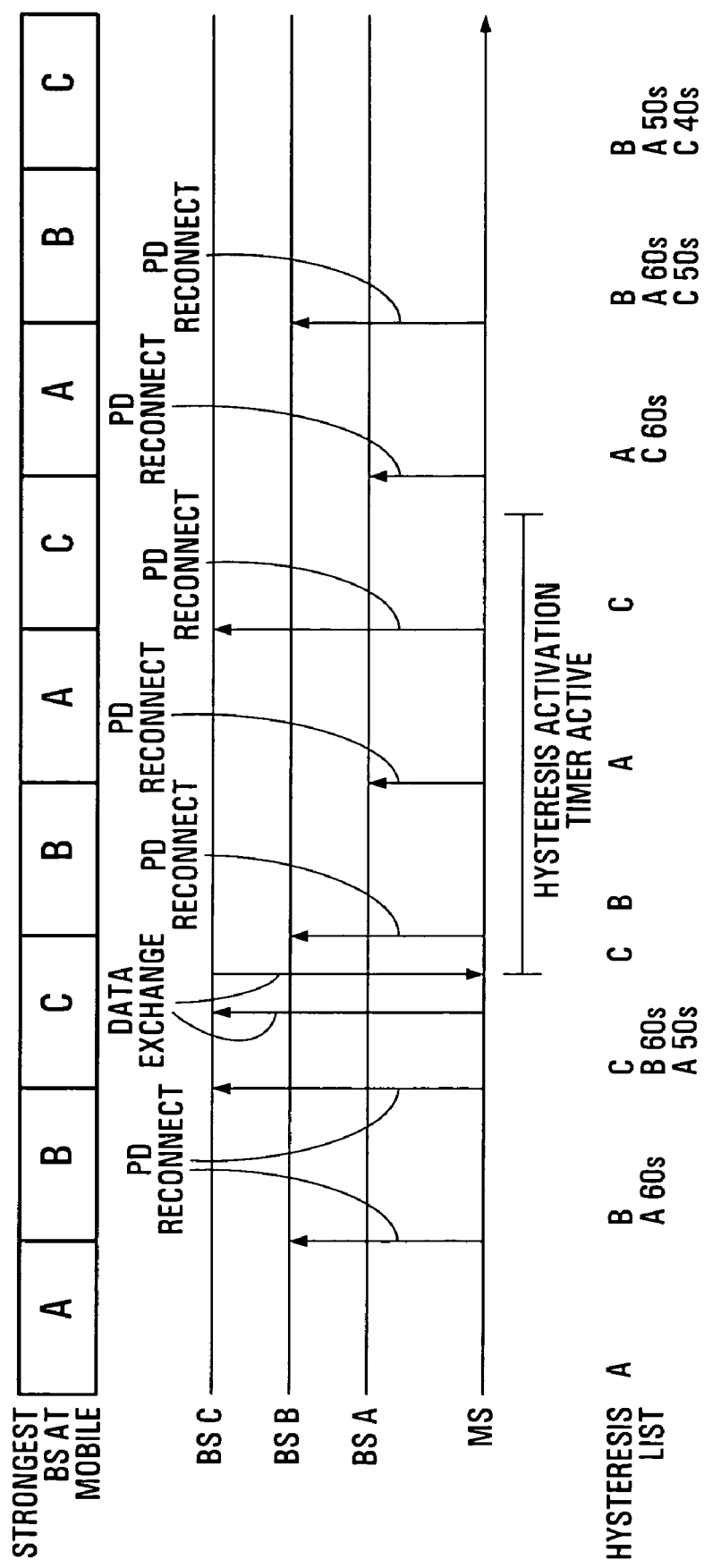
FIG. 13 is an example timeline of a mobile station performing packet data reconnects according to conventional methods.

Turning now to FIG. 13, an example timeline of a mobile station performing packet data reconnects according to conventional methods is shown. This example timeline provides a demonstration of how a mobile station such as the mobile station 32 shown in FIG. 1 performs packet data reconnects. In this example, there are at least three base stations: A, B, and C. As described earlier with reference to FIG. 1, each base station has a respective coverage area or SID/NID/PZID zone. Across the top of FIG. 13, provided is a sequence of base stations having respective SID/NID/PZID zones to which the mobile station detects to be strongest. The mobile station detects a different SID/NID/PZID zone to be strongest every 10 seconds. This scenario may occur for example when mobile station resides on a SID/NID/PZID boundary between three SID/NID/PZID zones. Packet data reconnects and packet data exchanges occur and are provided across the middle. Across the bottom, contents of the packet zone hysteresis list are shown.

Initially, the packet zone hysteresis list is empty except for the current zone, which is initially A. At the beginning, the mobile station detects A, then B, and then C to be strongest. As these transitions occur before any respective hysteresis timers expired, the packet zone hysteresis list contains an identification of all three SID/NID/PZID zones and respective hysteresis timers for A and B after the second packet data reconnect (abbreviated as PD reconnect). A packet data exchange occurs shortly after, which clears A and B from the packet zone hysteresis list. Hysteresis is disabled for duration of the packet zone hysteresis activation timer, which is 30 seconds in this example. During this time, packet data reconnects occur whenever the mobile station detects a different SID/NID/PZID zone to be strongest. After the packet zone hysteresis activation timer expires, hysteresis list is re-activated and entries in the packet zone hysteresis list can be entered. However, packet data reconnects continue to occur every 10 seconds until the mobile station has A, B, and C in the packet zone hysteresis list with respective active timers for A and C.

Hysteresis Reset

Figure 5:
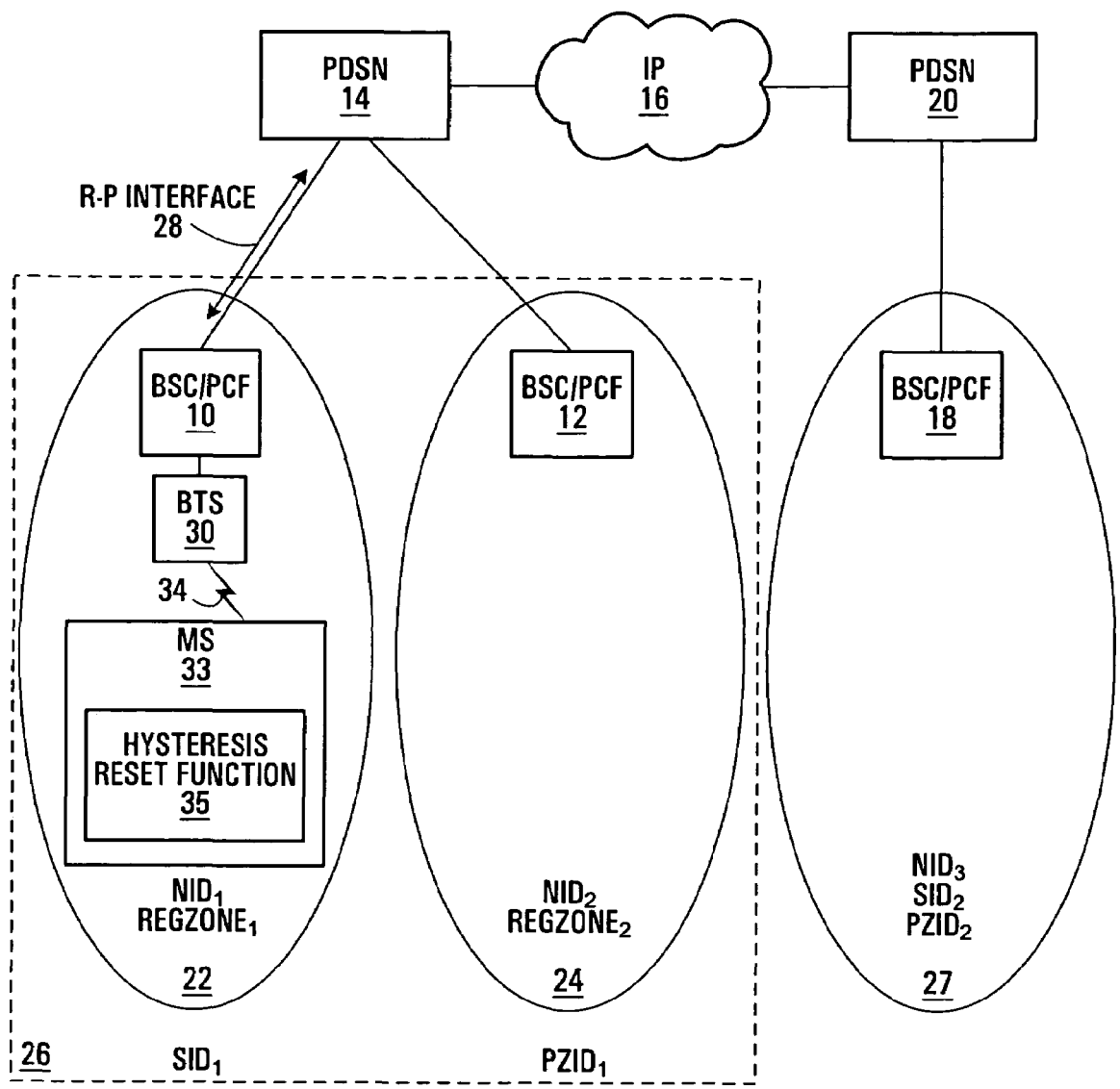
FIG. 5 is a block diagram of an example wireless system featuring a mobile station having hysteresis reset methods in accordance with an embodiment of the application.

Turning now to FIG. 5, a block diagram of an example wireless system featuring a mobile station having hysteresis reset methods in accordance with an embodiment of the application is shown. With the embodiment of FIG. 5, the wireless system is the same as that shown in FIG. 1 and therefore the description will not be repeated. However, FIG. 5 shows a mobile station 33 equipped with a hysteresis reset function 35. The behaviour of the hysteresis reset function 35 will be described in detail below with various examples. The hysteresis reset function 35 can be implemented as part of software residing on the mobile station 33; it can be implemented in hardware or firmware; alternatively it can be implemented as an appropriate combination of software, hardware and firmware. Also, while the hysteresis reset function 35 is shown as a discrete functional element, it is to be understood that it can also be implemented by making a series of modifications to software that is otherwise compliant with existing standards. For example, existing mobile stations have the capability to comply with 3GPP2 C.S0005 for the air-interface and 3GPP2 C.S0017-012-A for packet data services. The hysteresis reset function 35 can be embodied through a series of one or more changes to the otherwise standard compliant functionality.

It is to be very clearly understood that the wireless system depicted in FIG. 5 is for the purpose of example and explanation only. An arbitrary arrangement of components is contemplated. Furthermore, the BSC/PCF, BTS hierarchy within a given network is but one example of a method of providing an air-interface through to a mobile station. Other hierarchies may alternatively be implemented.

Turning now to FIGS. 6 through 11B, flowcharts of methods of hysteresis reset are shown. One or more, preferably all, of these methods may be implemented in a mobile station, for example, by the hysteresis reset function 35 of the mobile station 33 shown in FIG. 5. During an active packet data exchange there may be time intervals during which no packet data is being sent or received. A packet zone hysteresis reset timer is introduced, which gives a maximum time duration for which any active packet data exchanges collectively can go without sending or receiving packet data during which the packet zone hysteresis list is maintained and after which is to be cleared.

Behavior is introduced for common channel transmissions and traffic channel transmissions. While preferably the behavior for both types of transmission is implemented, in some instances, one or the other may be implemented. According to 3GPP2 C.S0005-D v1.0 and 3GPP2 C.S0017.12-A v1.0, the mobile station and infrastructure may exchange small packets on the common channel rather than setting up a traffic channel by sending "Short Packet data Bursts" on the common channel.

Figure 6:
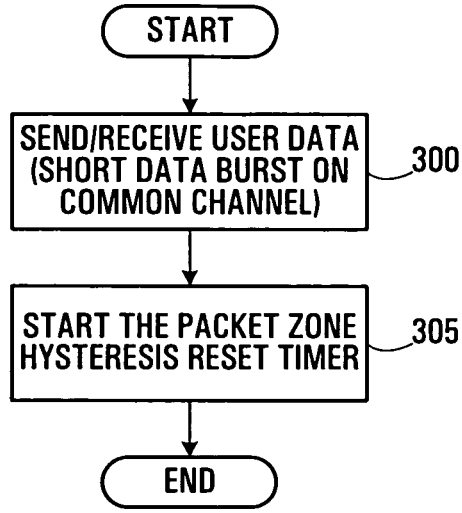
FIGS. 6 through 11B are flowcharts of methods of hysteresis reset in accordance with an embodiment of the application.

FIG. 6 shows the behavior of a mobile station when it sends or receives packet data using a short packet data burst on the common channel. If the mobile station sends or receives packet data using a short packet data burst at step 300, then it starts the packet zone hysteresis reset timer at step 305. Rather than deleting entries in the packet zone list other than the current entry, entries in the packet zone list with respective hysteresis timers $T_1, \ldots T_N$ are maintained. In this manner, hysteresis can be continued after a packet data exchange is complete using the existing entries. It is to be noted that there are many logically equivalent ways of achieving this functionality without necessarily implementing a list, or implementing timers.

Figure 7:
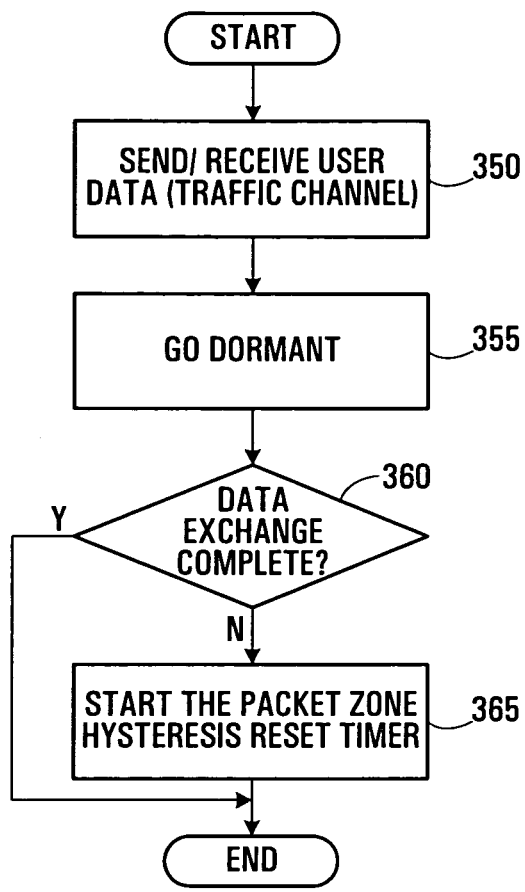

FIG. 7 shows the behavior of the mobile station when the mobile station sends or receives packet data on a traffic channel. If the mobile station sends or receives packet data on a traffic channel at step 350, then it goes dormant at step 355. In some embodiments, the traffic channel does not immediately go dormant, but rather stays active for some period to allow further traffic to be sent or received. The sending/receiving of traffic at 350 can be considered to include any such traffic that is sent/received before the traffic channel goes dormant. When the mobile station becomes dormant, a traffic channel is no longer maintained. If the mobile station determines that packet data exchange is complete at step 360, then the mobile station takes no further action. If the packet data exchange is determined to be incomplete, then the mobile station starts the packet zone hysteresis reset timer at step 365. In both cases, entries in the packet zone list with respective hysteresis timers $T_1, \ldots T_N$ are maintained.

There are many ways in which the mobile station can determine whether or not packet data exchange is complete. For example, if the mobile station sends an application layer packet (such as a email message, a portion of an email message, a calendar update, an address book update, a "ping", or a message containing a combination of these) and it receives an application layer acknowledgement and expects no further packet data from the application server (this could be understood based on application behavior, it could be signaled explicitly via packet data sent by the application server, or it could be based on a timeout with no further packet data received from the application server), then it may determine that packet data exchange is complete. Another way the mobile station may determine that packet data exchange is complete is if a particular application is closed or deactivated by the user. One example would be a web browser. If the user closes a web browser and no other applications are involved in a packet data exchange, the mobile may determine that the packet data exchange is complete. When there are multiple applications on the mobile device, the mobile will determine that the packet data exchange is complete only when all applications consider their packet data exchanges complete and no packet data from the wireless network is expected. It is to be understood that there are numerous ways in which the mobile station can determine whether or not packet data exchange is complete and the application is not limited to specific examples provided herein.

Prior to expiry of the packet zone hysteresis reset timer, the packet zone hysteresis list is maintained notwithstanding sending and/or receiving packet data as a short packet data burst (described with reference to FIG. 6) and/or on a traffic channel (described with reference to FIG. 7). Entries in the packet zone list are not cleared and the maximum size of the packet zone list is not changed. Furthermore, the mobile station continues to keep track of when the packet data reconnects occur by adding entries to the packet zone list and setting the respective hysteresis timers $T_1, \ldots T_N$ whenever the mobile station performs packet data reconnects.

Figure 8:
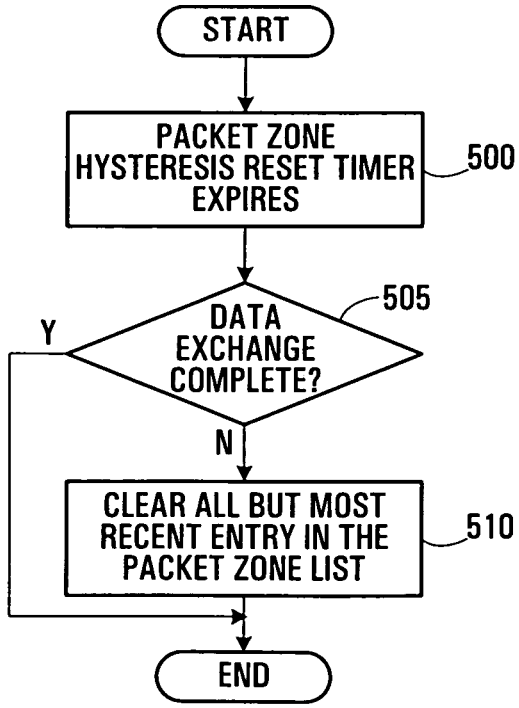

Turning now to FIG. 8, the behavior of the mobile station when the hysteresis reset timer expires is shown. If the mobile station detects that the hysteresis reset timer has expired at step 500, then it determines whether or not packet data exchange is complete at step 505. If the mobile station determines that packet data exchange is complete, then the mobile station does nothing. Therefore, if there are entries in the packet zone list having respective hysteresis timers $T_1, \ldots T_N$, then these entries are preserved. Alternatively, if the mobile station determines that packet data exchange is not complete, then at step 510 the mobile station clears all but the most recent entry in the packet zone list. Therefore, if the mobile station detects a change in SID/NID/PZID while dormant, then it will immediately perform a packet data reconnect and be able to complete packet data exchange in a new SID/NID/PZID zone. At this point, the packet zone list is built up again as new zones are entered.

The description of FIG. 8 and other Figures refers to entries being "cleared" from the packet zone list. In the context of this description, such clearing is intended to mean that a packet zone whose entry has been "cleared" is not subject to packet zone hysteresis any more. This does not necessitate physical removal of the entry, although that is one option. In another example, a mobile station may leave entries in the packet zone list and instead advance respective hysteresis timers $T_1, \ldots T_N$ so as to allow packet data reconnects to occur without undue delay. In yet another example, the mobile station may leave entries in the packet zone list and instead mark them as inactive for the purpose of hysteresis.

Figure 9:
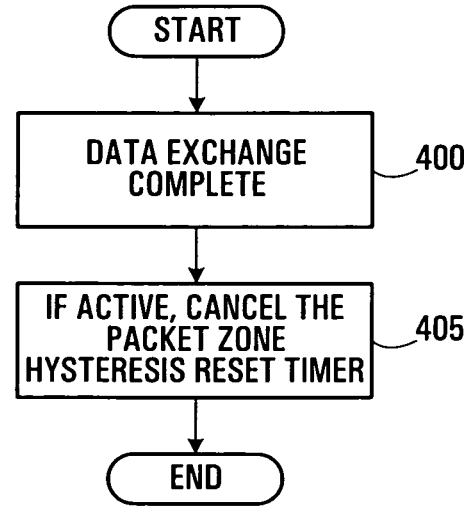

FIG. 9 shows a method of canceling the packet zone hysteresis reset timer upon detecting that packet data exchange is complete. If the mobile station detects that that packet data exchange is complete at step 400, then it cancels the packet zone hysteresis reset timer if it is active at step 405. By canceling the packet zone hysteresis reset timer when packet data exchange is complete, the packet zone hysteresis list is not reset. Instead, entries in the packet zone list with respective hysteresis timers $T_1, \ldots T_N$ are maintained.

In some embodiments, when implementing the method of FIG. 9, the yes-path of step 505 in FIG. 8 is never executed because the method of FIG. 9 ensures that the packet zone hysteresis reset timer is cancelled if packet data exchange is complete. In other embodiments, it is possible for the yes-path of step 505 in FIG. 8 to be executed for example if packet data exchange completes at the same time as the packet zone hysteresis reset timer expires. In this example, the method of FIG. 9 will execute, but the packet zone hysteresis reset timer is not cancelled as it has expired. Since the packet zone hysteresis reset timer has expired and packet data exchange is complete, step 500 and the yes-path of step 505 in FIG. 8 are executed.

Figure 10:
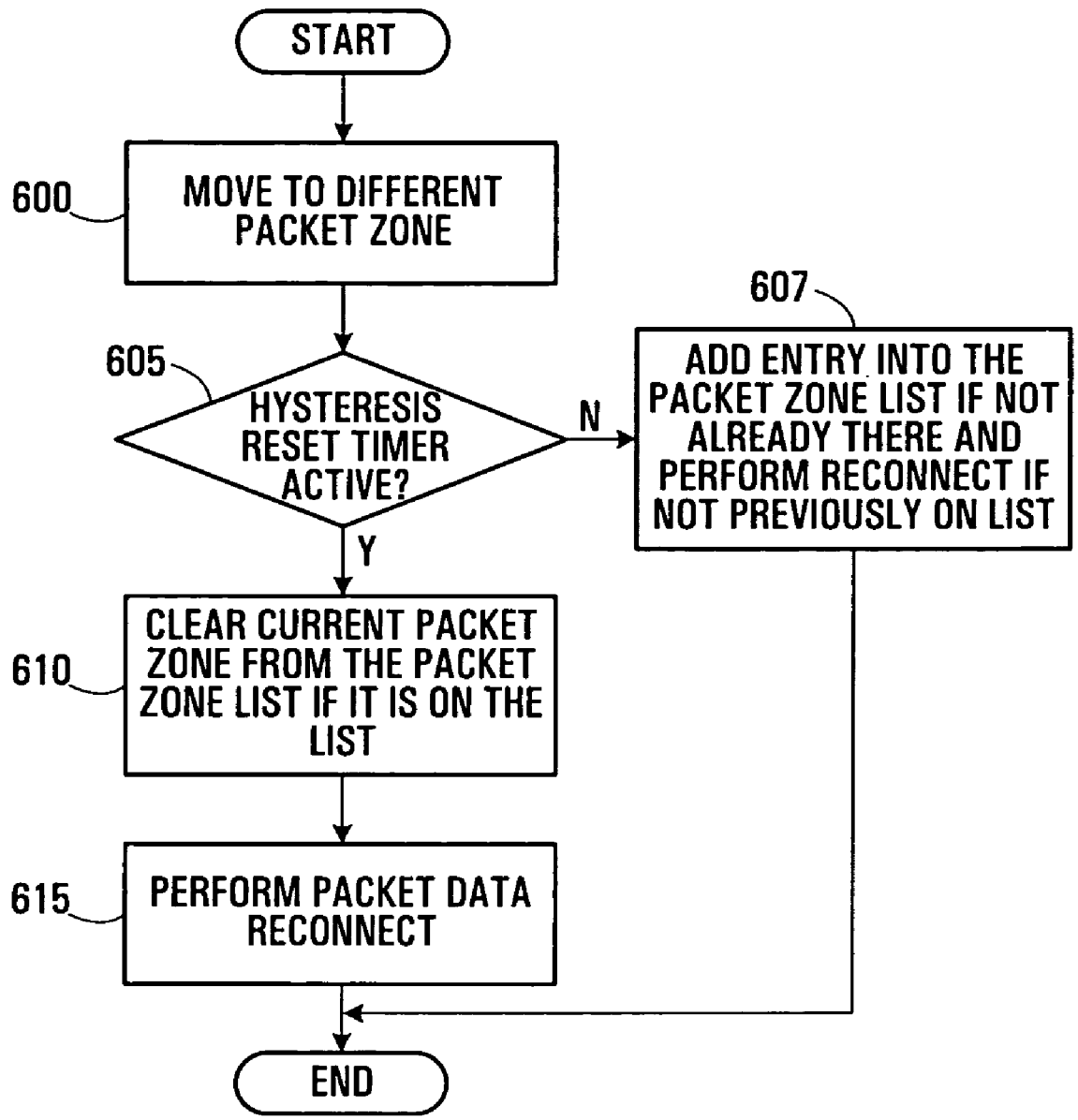

Turning now to FIG. 10, the behaviour of the mobile station when it moves to a different SID/NID/PZID zone is shown. If the mobile station moves to a different SID/NID/PZID zone at step 600, then it determines whether or not the hysteresis reset timer is active at step 605. If the hysteresis reset timer is not active, then at step 607 the mobile station will add the different SID/NID/PZID as the most recent entry in the packet zone list if there is not already an entry and will start the respective hysteresis timer for the previous SID/NID/PZID, and will perform a reconnect if the different zone was not on the list. An active packet zone hysteresis reset timer (yes path step 605) means that there is an incomplete packet data exchange because if packet data exchange was determined to be complete, then at step 400 in FIG. 9 the packet zone hysteresis reset timer would be cancelled. If packet data exchange is determined to be incomplete and the mobile station has determined that it is in a different SID/NID/PZID zone, then the mobile station will perform a packet data reconnect in order to maintain packet data connectivity. The mobile station clears the current SID/NID/PZID zone from the packet zone list if it is in the packet zone list at step 610 and perform a packet data reconnect for the current SID/NID/PZID at step 615. Clearing the current SID/NID/PZID from the packet zone list may include cancelling the respective hysteresis timer for the SID/NID/PZID. While the hysteresis reset timer is active and there is an incomplete packet data exchange, the mobile station will always be connected to the current SID/NID/PZID zone, but will still maintain hysteresis information for previously visited SID/NID/PZIDs.

Figure 11A:
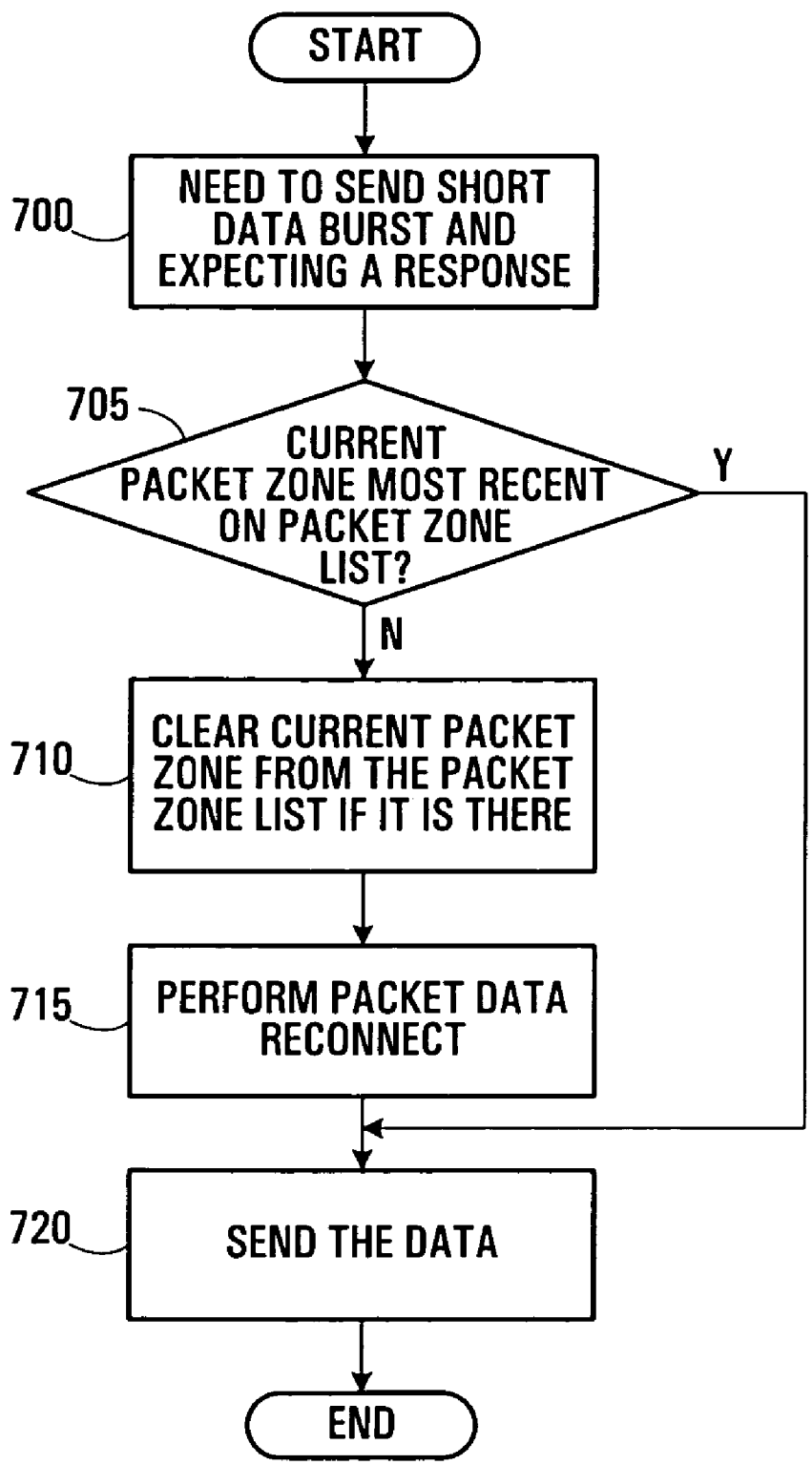

Turning now to FIG. 11A, shown is the behaviour of the mobile station when it needs to send a short packet data burst to which a response is expected and the mobile station may not have performed a reconnect in the current zone and as such the system may not know where the mobile station is. If the mobile station needs to send a short packet data burst to which a response is expected at step 700, then at step 705 the mobile station determines whether or not it has moved to a different packet data zone. The mobile station knows if it has moved to a different packet data zone when the most recent entry in the packet zone list is different than the current packet zone. If the mobile station determines that it has moved to a different packet data zone, then at step 710 the mobile station clears the SID/NID/PZID zone from the packet zone list and performs a packet data reconnect at step 715 to let the system know where it is. Steps 705, 710, and 715 ensure that the mobile station is connected to the current SID/NID/PZID zone. At step 720, the mobile station sends the short packet data burst. This embodiment assumes that the mobile station need not necessarily perform a reconnect to send a short packet data burst. However, if a response is expected, it will need to do a reconnect.

In some embodiments, packet data is sent as a short packet data burst on the common channel as described with reference to FIG. 6. In other embodiments, the packet data is sent on a traffic channel as described with reference to FIG. 7. In some embodiments, at step 715 the mobile station specifies whether the common channel or a traffic channel is to be used for sending the packet data. In particular, during the packet data reconnect, the mobile station specifies in the origination message the DRS (packet data ready to send) bit. By setting DRS=1, the mobile station requests a traffic channel. By setting DRS=0, a traffic channel is not requested.

The method of FIG. 11A allows the mobile station to send a short packet data burst and receive a response while maintaining the hysteresis list. If the mobile station has moved to a different packet zone and needs to send a short packet data burst to which a response is expected, then it performs a packet data reconnect in order to inform the network of its location. Preferably, the packet data reconnect is performed prior to sending packet data as it can request a traffic channel for the packet data exchange. In other embodiments, the packet data reconnect is performed immediately after sending packet data. Note that if the mobile were not expecting a response it could avoid steps 705, 710, and 715.

The methods of FIGS. 10 and 11A are similar in that they are concerned with performing a packet data reconnect upon detecting that the mobile station has moved to a new packet data zone and a packet data exchange is active (described with reference to FIG. 10) or known to become active (described with reference to FIG. 11A). Once packet data exchange becomes active at step 720, then as described earlier with reference to FIGS. 6, 7 and 9, the packet zone hysteresis reset timer is started upon packet data exchange that is determined to be incomplete. As described earlier with reference to FIG. 8, if packet data exchange is determined to be incomplete when the packet zone hysteresis reset timer expires, then all entries except for the most recent entry in the packet zone list are cleared so that a packet data reconnect can be performed and packet data exchange can be completed. However, as described earlier with reference to FIGS. 8 and 9, if packet data exchange is completed before the packet zone hysteresis timer expires, then the entries in the packet zone list are not cleared.

As discussed in detail above, TIA-707.12-B includes a packet zone hysteresis that reduces the number of packet data reconnects when a mobile station ping-pongs between multiple packet zones. Because of this feature, the mobile station does not need to perform a packet data reconnect when moving to a packet zone in its hysteresis list. TIA-707.12-B also includes a feature called "Short Data Burst" which allows the mobile station to send short data packets on the control channel rather than setting up a traffic channel. Disadvantageously, TIA-707.12-B does nothing to support interaction between the packet zone hysteresis feature and the short data burst feature. The so-called "A-10" connection, also referred to as the R-P interface and more generally the PCT-PDSN interface, is involved in this control channel. After a mobile station moves into the coverage area of a different PCF, a packet data reconnect is needed to cause the A10 connection from the PDSN to be moved to the new PCF, and to thereby enable the short data burst feature to continue to function. According to the standard as currently defined, if the mobile station sends a short data burst when in a zone not most recent in its hysteresis list, the data will be lost because the A10 is not moved. While the expression "short data burst" is introduced above in the context of a particular standard, more generally, this is intended to mean any short data burst on a control channel as opposed to a traffic channel.

Figure 11B:
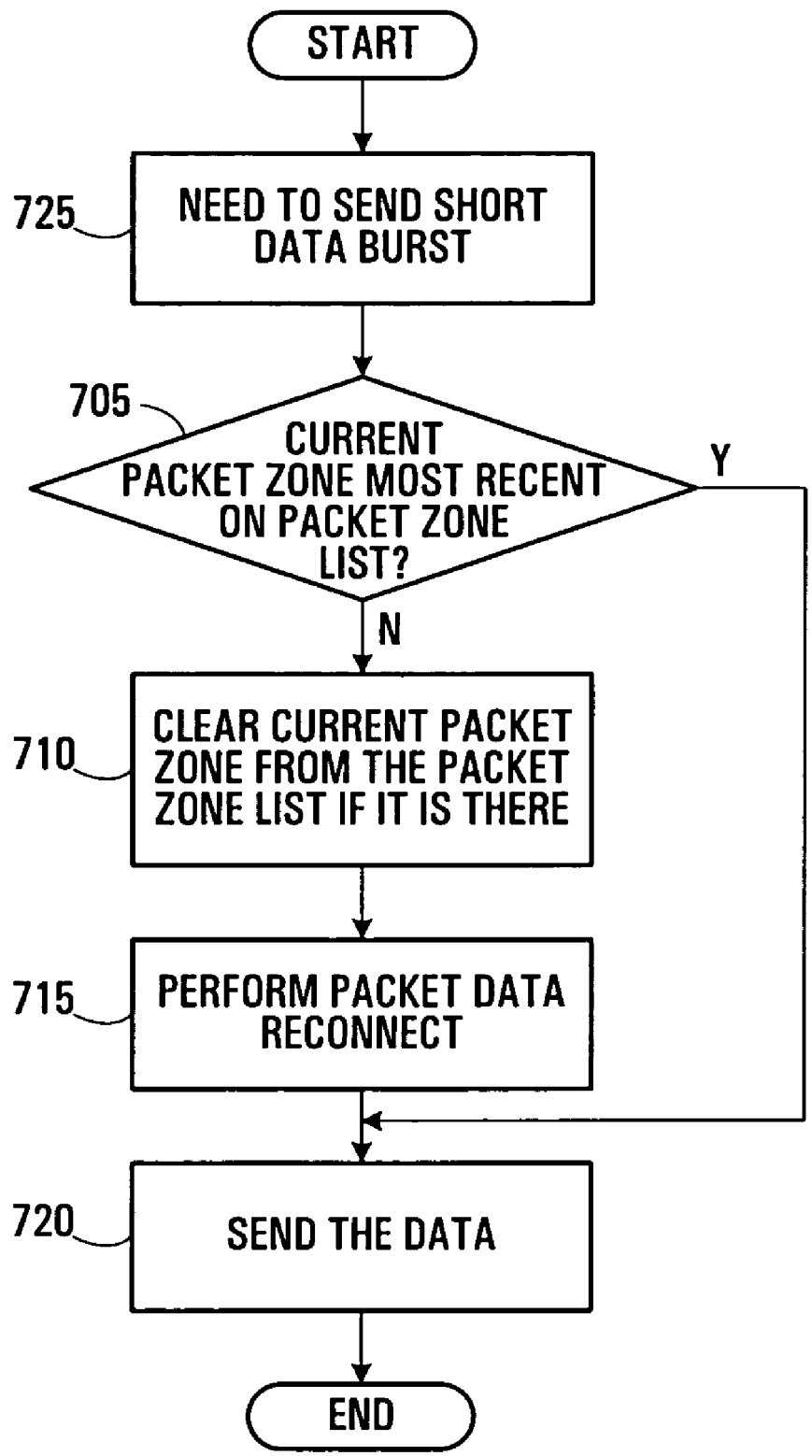

Turning now to FIG. 11B, shown is the behaviour of a mobile station provided by another embodiment when it needs to send a short packet data burst but may not have performed a reconnect in the current zone. If the mobile station needs to send a short packet data burst at step 725, then at step 705 the mobile station determines whether or not it has moved to a different packet data zone. The mobile station knows if it has moved to a different packet data zone when the most recent entry in the packet zone list is different than the current packet zone. If the mobile station determines that it has moved to a different packet data zone, then at step 710 the mobile station clears the SID/NID/PZID zone from the packet zone list and performs a packet data reconnect at step 715. At step 720, the mobile station sends the short packet data burst. This embodiment assumes the mobile station needs to have performed a reconnect to send a short packet data burst.

In some implementations, the short data burst and the reconnect are performed at the same time by encapsulating the short data burst within another message used for the reconnect. In a very particular example of this, the mobile station checks the C.S0005 protocol revision of the base station. C.S0005 specifies the signaling protocol for the air interface. The protocol revision is broadcast from the base station to all mobile stations on a control channel (an 8-bit field called P_REV) to tell the mobile station its protocol revision. A C.S0005-D base station sets the field to '00001011'. If the protocol revision of the base station is C.S0005-D or later the mobile station performs the short data burst and the reconnect at the same time by encapsulating the short data burst in the C.S0005-D Reconnect Message. If the protocol revision of the base station is less than C.S0005-D, the mobile station sends an Origination Message and the Data Burst Message as separate messages.

A specific solution to the short data burst problem has been detailed above. More generally, a mobile station can deal with this by performing packet zone hysteresis to reduce a number of packet data service reconnects when a mobile station ping-pongs between multiple packet zones, where packet zone hysteresis is to be interpreted very generally in this context, and in advance of sending a short data burst on a control channel, performing a packet data reconnect if necessary to support transmitting the short data burst.

Many of the detailed examples presented assume that packet data service reconnect occurs across changes in SID/NID/PZID. More generally, reconnect is considered to occur across changes in packet data service reconnect zone. The reconnect zone does not have to be an actual parameter. In the particular examples given, any time any one of SID/NID/PZID changes, the reconnect zone changes. Other reconnect triggers are contemplated.

Figure 12:
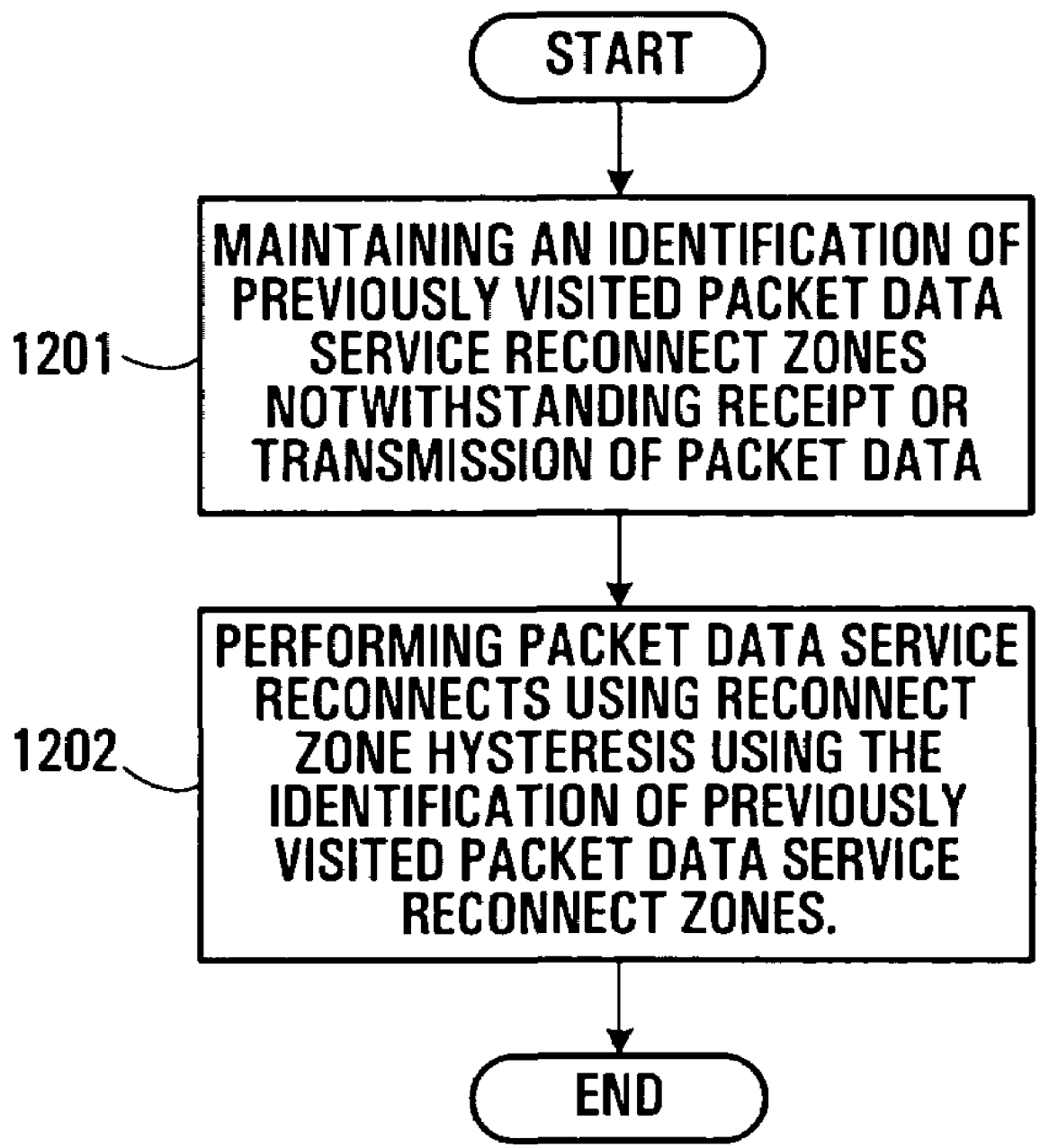
FIG. 12 is a flowchart of another method of hysteresis reset in accordance with an embodiment of the application.

Turning now to FIG. 12, a flowchart of another method of hysteresis reset in accordance with an embodiment of the application is shown. This method may be implemented in a mobile station, for example, by the hysteresis reset function 35 of the mobile station 33 shown in FIG. 5. At step 1201, the mobile station maintains an identification of previously visited packet data service reconnect zones notwithstanding receipt or transmission of packet data. At step 1202, the mobile station performs packet data service reconnects using reconnect zone hysteresis using the identification of previously visited packet data service reconnect zones.

The mobile station performs packet data service reconnects using reconnect zone hysteresis. According to reconnect zone hysteresis, the mobile station waits until a certain time has passed since last visiting a visited packet data service reconnect zone before performing a packet data service reconnect in the visited packet data service reconnect zone. There are many ways to implement such reconnect zone hysteresis. In one example, the mobile station maintains hysteresis information, namely an identification of visited packet data service reconnect zones and a respective time identification since the mobile station last visited each of the visited packet data service reconnect zones. In this example, when the mobile station moves to a packet data service reconnect zone, it will know if the packet data service reconnect zone has been recently visited based on its identification of visited packet data service reconnect zones. If the mobile recognises that the packet data service reconnect zone has been recently visited, then it may refrain from performing a packet data service reconnect until the respective time identification indicates that enough time has passed since visiting the packet data service reconnect zone.

In the described examples, an entry is made into the hysteresis list for a new zone (i.e. not previously visited) although a reconnect is performed in the new zone, and no timer is started. On this basis, if the most recent entry is for the current zone, then the mobile station knows that a reconnect has been performed for the current zone. Setting the maximum length of the list to one means that a reconnect will happen every time the zone changes and hysteresis has effectively been de-activated. There are many equivalent ways of achieving this. For example, entries might be made only when exiting a visited zone, with some other indication maintained of whether a reconnect has been performed or not for the current zone. In that case, setting the maximum length of the list to zero would result in a reconnect every time the zone changes. Furthermore, more generally this effect can be achieved without necessarily doing anything with the maximum length of the list, but rather by simply activating or de-activating hysteresis in any suitable fashion.

Figure 14:
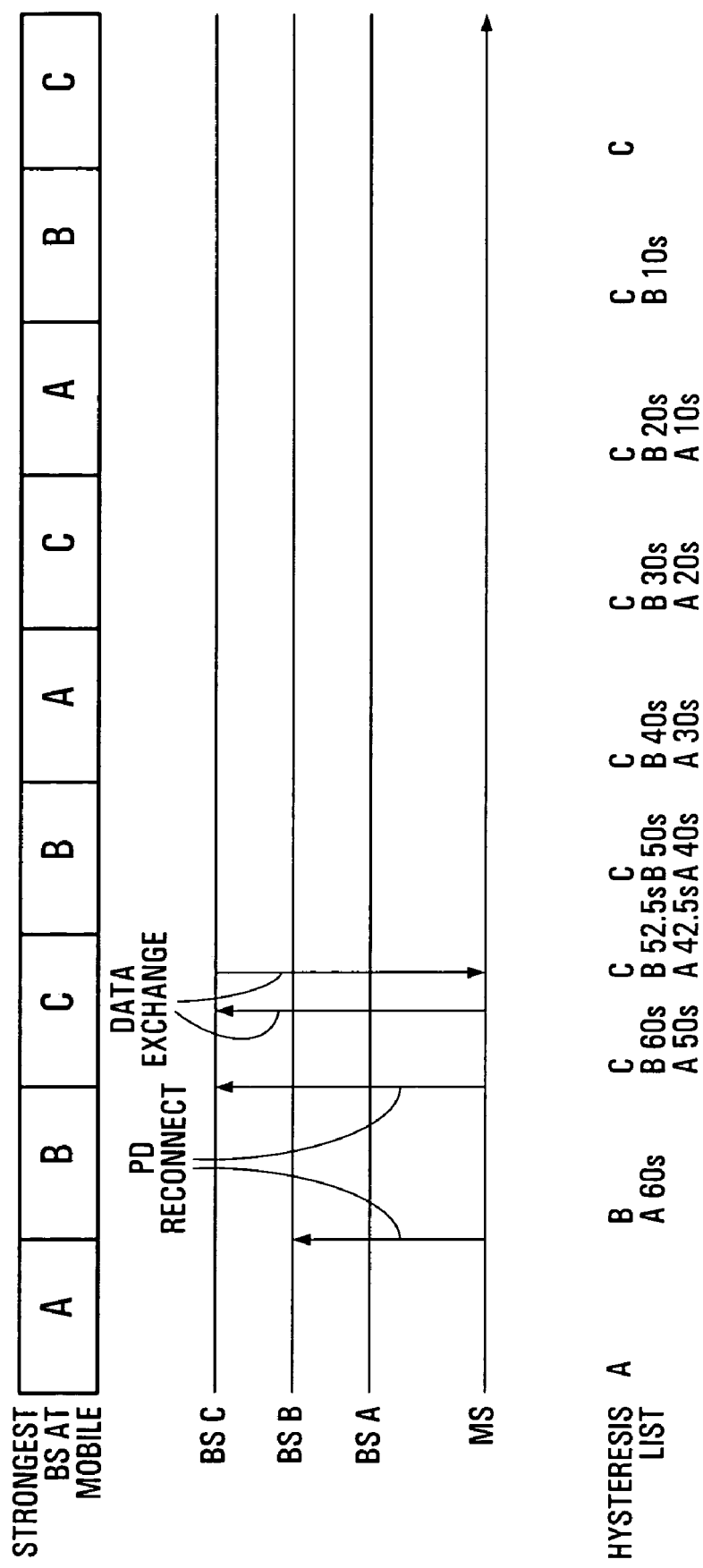
FIG. 14 is an example timeline of a mobile station performing packet data reconnects according to an embodiment of the application.

Turning now to FIG. 14, an example timeline of a mobile station performing packet data reconnects according to an embodiment of the application is shown. This example timeline provides a demonstration of how a mobile station performs packet data reconnects when it is implemented with one or more, preferably all, of the methods described with reference to FIGS. 6 through 12. Across the top of FIG. 14, provided is a sequence of base stations having respective SID/NID/PZID zones to which the mobile station detects to be strongest. This sequence is the same as the sequence described with reference to FIG. 13. Also, FIG. 14 shows a packet data exchange, which occurs at the same time as the packet data exchange in FIG. 13. However, significantly fewer packet data reconnects are shown in FIG. 14.

Initially, the packet zone hysteresis list is empty except for the current zone, which is initially A. At the beginning, the mobile station detects A, then B, and then C to be strongest. As these transitions occur before any respective hysteresis timers expired, the packet zone hysteresis list contains an identification of all three SID/NID/PZID zones and respective hysteresis timers for A and B after the second packet data reconnect (abbreviated as PD reconnect). A packet data exchange commences shortly after and is completed before the traffic channel goes dormant. This corresponds to the yes path of step 360 of FIG. 7. The mobile station sends packet data, receives the response, determines that the packet data exchange is complete, goes dormant, and does not start the hysteresis reset timer. The packet zone hysteresis list is not cleared at any point on the timeline. The mobile station does not perform packet data reconnects for the remainder of the timeline as the mobile station has maintained the packet zone hysteresis list.

Hysteresis Activation Embodiment

Figure 15:
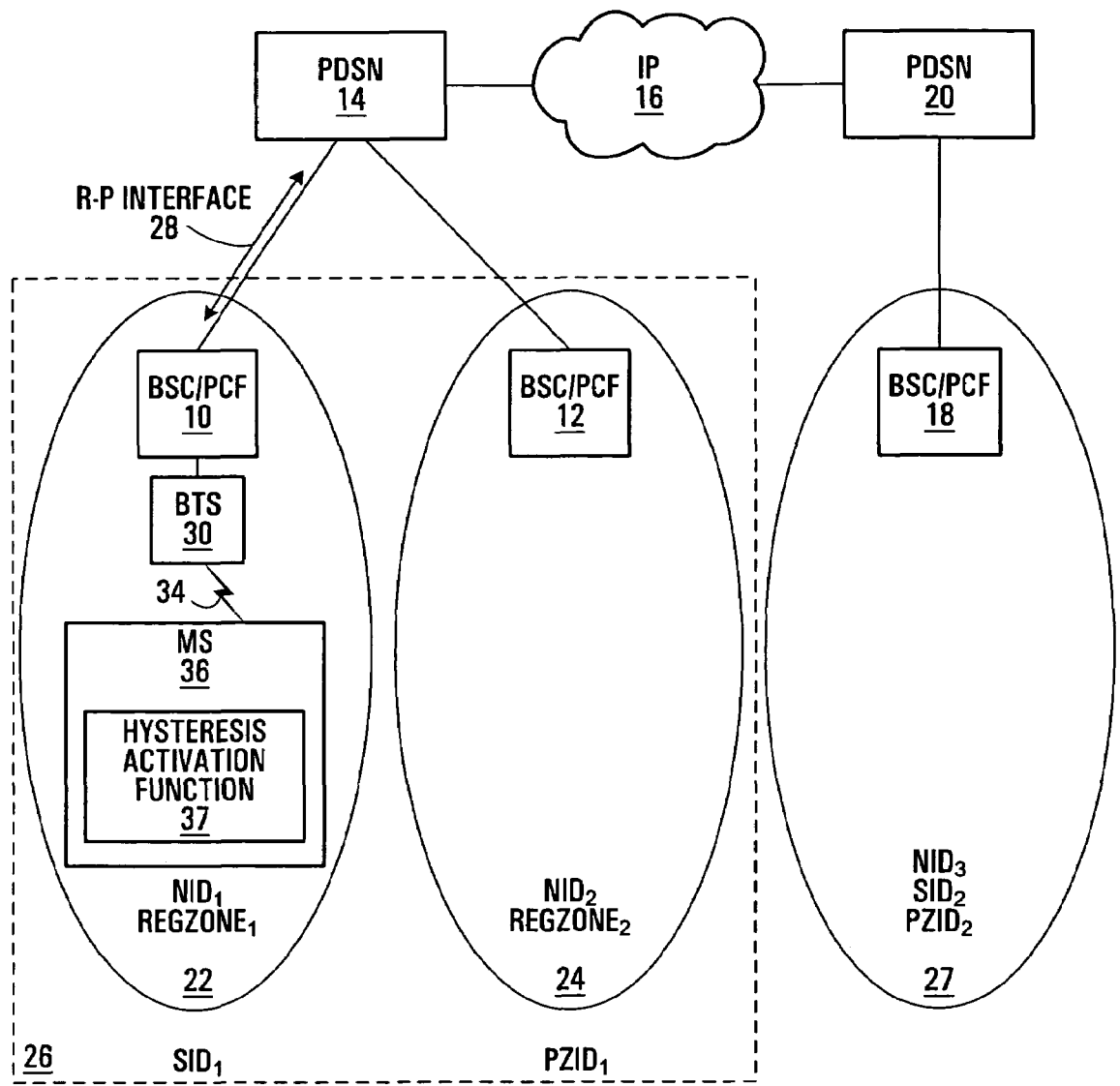
FIG. 15 is a block diagram of an example wireless system featuring a mobile station having a hysteresis activation method in accordance with an embodiment of the application.

Turning now to FIG. 15, a block diagram of an example wireless system featuring a mobile station having a hysteresis activation method in accordance with an embodiment of the application is shown. With the embodiment of FIG. 15, the wireless system is the same as that shown in FIG. 1 and therefore the description will not be repeated. However, FIG. 15 shows a mobile station 36 equipped with a hysteresis activation function 37. The behaviour of the hysteresis activation function 37 will be described in detail below with various examples. The hysteresis activation function 37 can be implemented as part of software residing on the mobile station 33; it can be implemented in hardware or firmware; alternatively it can be implemented as an appropriate combination of software, hardware and firmware. Also, while the hysteresis activation function 37 is shown as a discrete functional element, it is to be understood that it can also be implemented by making a series of modifications to software that is otherwise compliant with existing standards. For example, existing mobile stations have the capability to comply with 3GPP2 C.S0005 for the air-interface and 3GPP2 C.S0017-012-A for packet data services. The hysteresis activation function 37 can be embodied through a series of one or more changes to the otherwise standard compliant functionality.

It is to be very clearly understood that the wireless system depicted in FIG. 15 is for the purpose of example and explanation only. An arbitrary arrangement of components is contemplated. Furthermore, the BSC/PCF, BTS hierarchy within a given network is but one example of a method of providing an air-interface through to a mobile station. Other hierarchies may alternatively be implemented.

Figure 16:
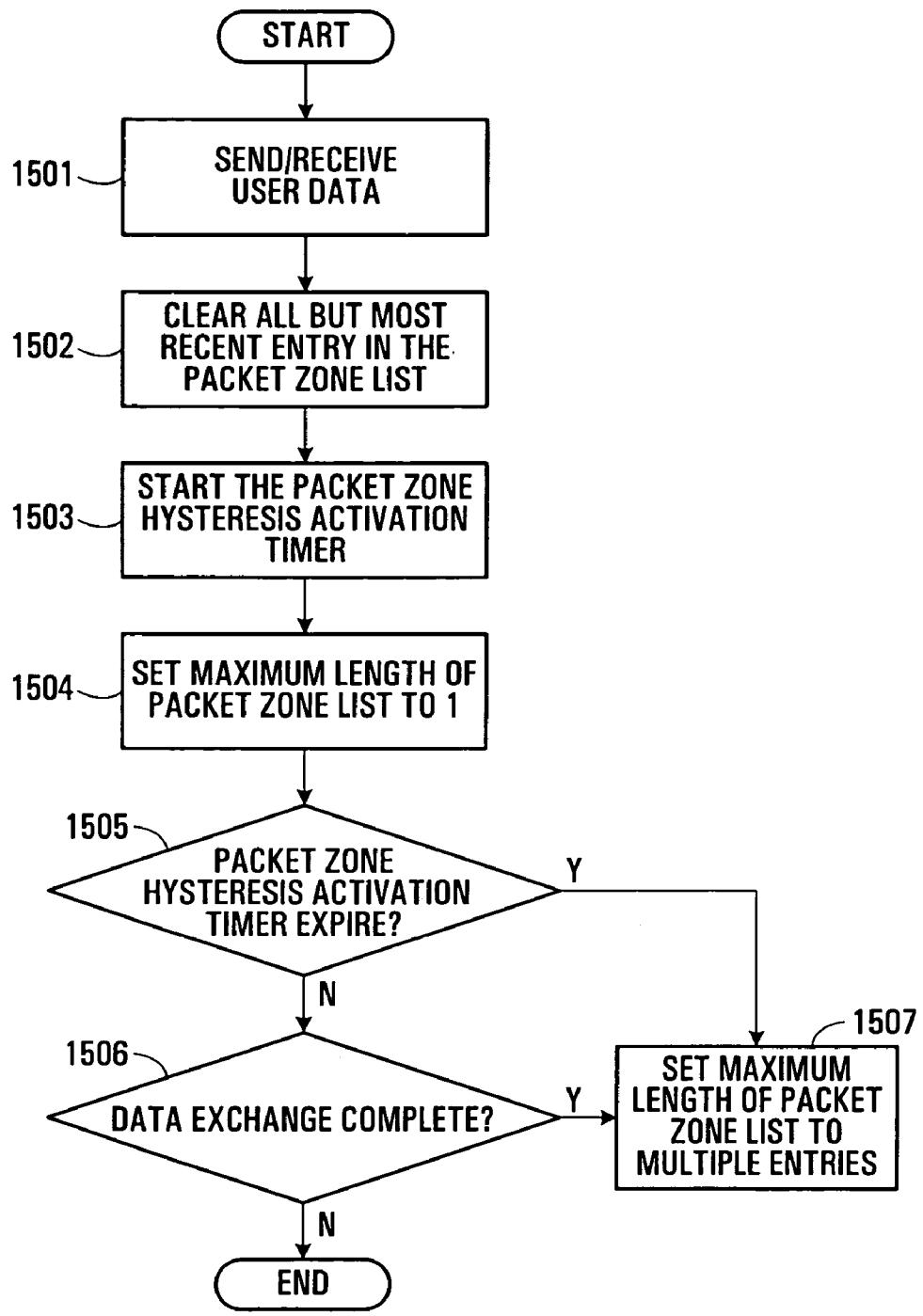
FIG. 16 is a flowchart of a method of hysteresis activation in accordance with an embodiment of the application.

Turning now to FIG. 16, a flowchart of a method of hysteresis activation in accordance with an embodiment of the application is shown. This method allows hysteresis to be re-activated upon detecting that packet data exchange is complete. This method may be implemented in a mobile station, for example, the hysteresis activation function 37 of the mobile station 36 shown in FIG. 15.

If the mobile station has sent or received user packet data at step 1501, then at step 1502 the mobile station deletes all entries in the packet zone list except for the newest entry. At step 1503, the mobile station starts a packet zone hysteresis activation timer. If the packet data exchange was on a traffic channel, then the packet zone hysteresis activation timer starts when the mobile station goes dormant. For the case of a short packet data burst on the common channel, the mobile station will already be dormant. At step 1504, the mobile station sets the maximum length of the packet zone list to 1. This effectively disables the reconnect hysteresis feature since the packet zone list cannot maintain a record of previously visited SID/NID/PZID zones. When the packet zone hysteresis activation timer expires at step 1505 or the packet data exchange is determined to be complete at step 1506, hysteresis is re-activated at step 1507 by setting the maximum length of packet zone list back to multiple entries. Advantageously, if packet data exchange completes before the packet zone hysteresis activation timer expires, then hysteresis is re-activated without waiting for the packet zone hysteresis activation timer to expire. In some embodiments, the packet zone hysteresis activation timer is cancelled at step 1507 if it is still active.

Figure 17:
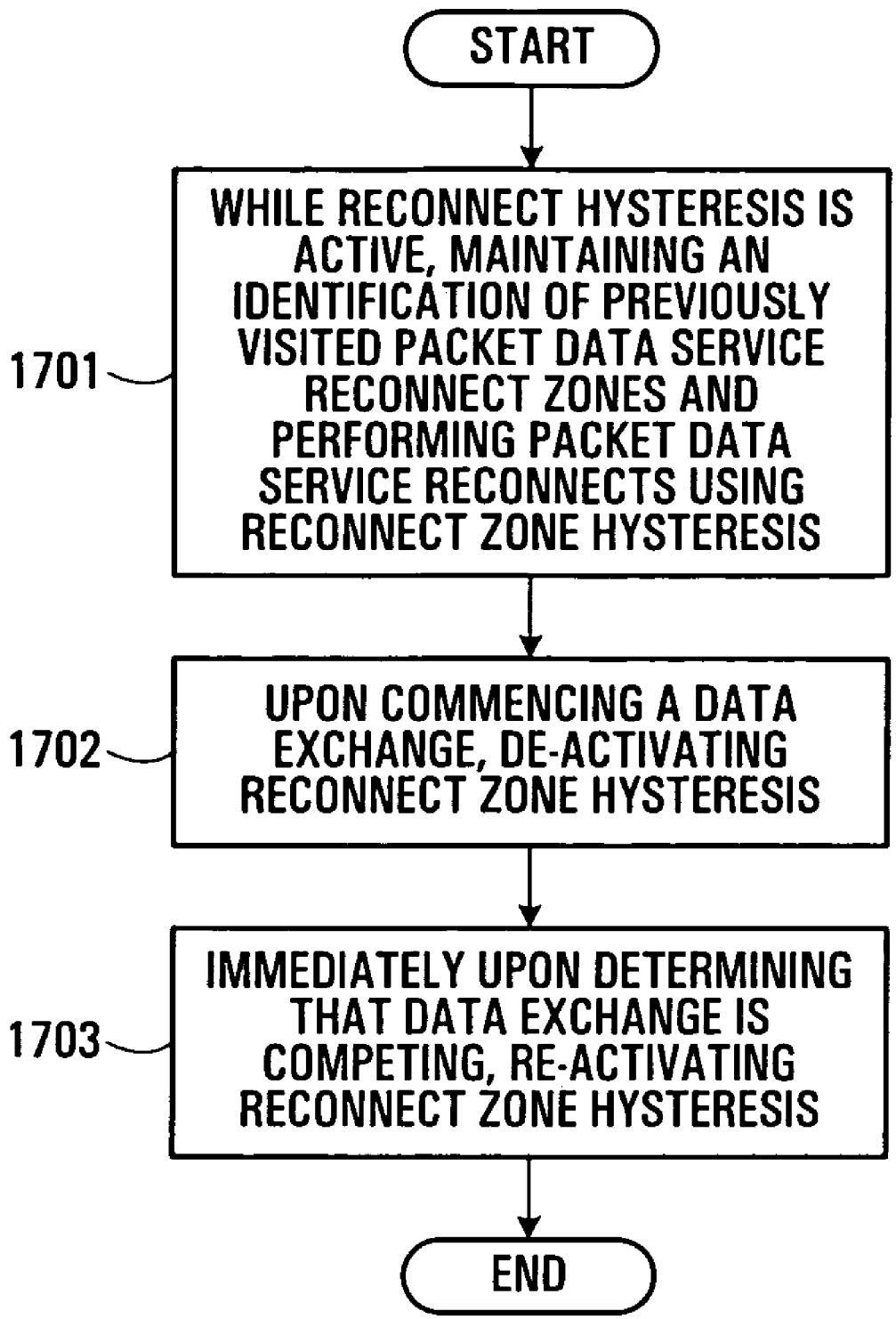
FIG. 17 is a flowchart of another method of hysteresis activation in accordance with an embodiment of the application.

Turning now to FIG. 17, a flowchart of another method of hysteresis activation in accordance with an embodiment of the application is shown. This method may be implemented in a mobile station, for example, the hysteresis activation function 37 of the mobile station 36 shown in FIG. 15. At step 1701, while reconnect zone hysteresis is active, the mobile station maintains an identification of previously visited packet data service reconnect zones and performs packet data service reconnects using reconnect zone hysteresis using the identification of previously visited packet data service zone. At step 1702, upon commencing a packet data exchange, the mobile station de-activates reconnect zone hysteresis. At step 1703, immediately upon determining that packet data exchange is complete, the mobile station re-activates reconnect zone hysteresis. De-activating and re-activating reconnect zone hysteresis might for example be achieved by setting the maximum size of a hysteresis list. Other mechanisms can be used.

Mobile Stations Unaware of Packet Data Exchanges Completing

Many of the methods shown in FIGS. 6 through 12 and 16 through 17 involve the mobile station determining whether or not a packet data exchange is complete. Several examples have been provided as to how a mobile station can determine that a packet data exchange is complete. However, some mobile stations are unaware of whether or not packet data exchanges are complete as they operate at a lower layer than for example an application causing the packet data exchange. Therefore, these mobile stations are not able to determine that any packet data exchange is complete. Accordingly, in some embodiments these mobile stations assume that packet data exchange is incomplete when executing method steps requiring that the mobile station determine whether or not packet data exchange is complete.

In some embodiments, one or more of the methods shown in FIGS. 6 through 12 are simplified when implemented in a mobile station by removing processing paths following determination of a packet data exchange being complete. For example, with reference to FIG. 8, upon expiry of the hysteresis reset timer, the mobile station deletes all but the most recent entry in the packet zone list. Therefore, a packet data exchange triggers all but the most recent entry in the packet zone to be deleted at a time period after the packet data exchange commences. During this time, the mobile station is still able to perform packet data reconnects to packet data zones that are included in the packet zone list.

Another embodiment provides a computer readable medium having instructions stored thereon for execution by a mobile station to implement any of the methods described herein.

Numerous modifications and variations of the present application are possible in light of the above teachings. It is therefore to be understood that within the scope of the appended claims, the application may be practised otherwise than as specifically described herein.

I claim:

1. A method in a mobile station comprising:
    performing packet zone hysteresis to reduce a number of packet data service reconnects when a mobile station ping-pongs between multiple packet zones;
    when a short data burst needs to be transmitted on a control channel, performing a packet data reconnect if necessary to support transmitting the short data burst;

determining if a base station to which a reconnect is to be performed supports sending the short data burst encapsulated within a reconnect message by examining a C.S0005 revision of the base station and, if the C.S0005 indicates revision D or higher, determining that the short data burst can be sent encapsulated within a reconnect message;

if the base station supports sending the short data burst encapsulated within a reconnect message, sending the short data burst encapsulated within a reconnect message, and otherwise sending a message for packet data service reconnect separately from the short data burst.

2. The method of claim 1 wherein performing packet zone hysteresis comprises:

maintaining an identification of previously visited packet data service reconnect zones notwithstanding receipt or transmission of packet data; and performing packet data service reconnects using reconnect zone hysteresis using the identification of previously visited packet data service reconnect zones.

3. A mobile station adapted to implement the method of claim 1.

* * * * *